O. C. IVERS.
COLLAPSIBLE AND DEMOUNTABLE TIRE RIM.
APPLICATION FILED NOV. 7, 1914.
1,130,604.
Patented Mar. 2, 1915.
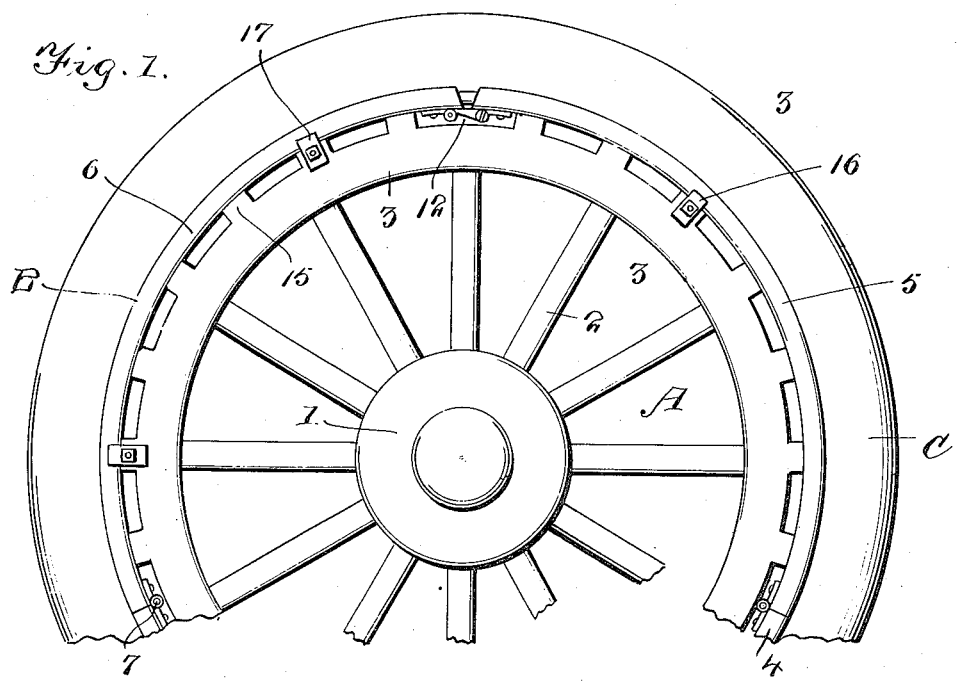
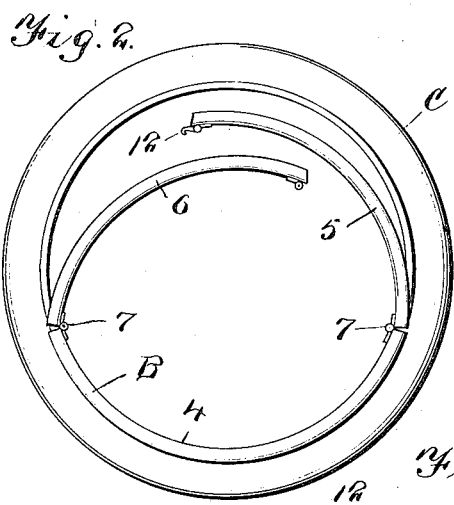
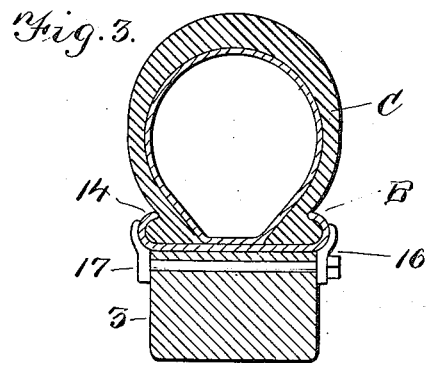
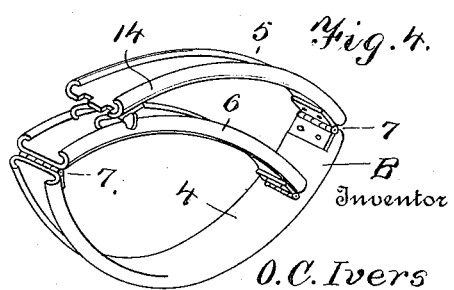
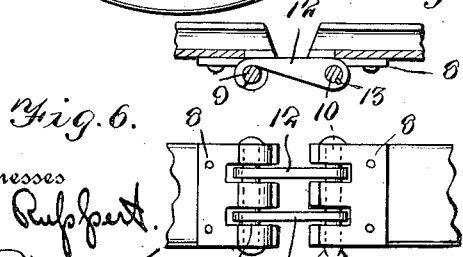

UNITED STATES PATENT OFFICE.

OSCAR COLLIS IVERS, OF NEW YORK, N. Y.

COLLAPSIBLE AND DEMOUNTABLE TIRE-RIM.

1,130,604. Specification of Letters Patent. Patented Mar. 2, 1915.

Application filed November 7, 1914. Serial No. 870,892.

*To all whom it may concern:*

Be it known that I, OSCAR COLLIS IVERS, a citizen of the United States, residing at New York, in the county of Kings and State of New York, have invented new and useful Improvements in Collapsible and Demountable Tire-Rims, of which the following is a specification.

This invention relates to collapsible and demountable tire rims, the object in view being to produce a rim of the character referred to which may be easily connected with and disconnected from the tire by inexperienced persons and which is collapsible in such a way that it may be folded compactly and conveniently carried in the machine instead of on the present day tire irons located on the running boards and at the back of the machine.

With the above and other objects in view, the invention consists in the novel construction, combination and arrangement of parts, as herein described, illustrated and claimed.

In the accompanying drawings:—Figure 1 is a side elevation of a portion of a wheel showing the demountable and collapsible rim of this invention applied thereto and also a portion of a pneumatic tire. Fig. 2 is a side elevation of the rim and tire on a reduced scale showing the manner of collapsing and spreading the rim. Fig. 3 is a cross section on the line 3—3 of Fig. 1. Fig. 4 is a perspective view of the rim *per se.* Fig. 5 is an enlarged fragmentary section showing one of the latches and the operating shaft therefor. Fig. 6 is a plan view of the same.

Referring to the drawings A generally designates a wheel of the usual construction embodying the hub 1, spokes 2 and felly 3.

B generally designates the demountable and collapsible rim of this invention which is shown as comprising a plurality of arcuate sections together forming in complemental relation an annular rim adapted to carry, support and hold a pneumatic tire C.

Under the arrangement shown in Fig. 2, the rim is composed of three sections 4, 5 and 6, said sections being connected together at their meeting extremities by means of hinges 7. To the outer extremity of each of the sections 5 and 6 is fixedly attached a hinge knuckle 8. One of said knuckles is provided with a permanently attached hinge pin 9 while the other knuckle contains a rock shaft 10 provided at one end with an operating head 11. Intermediate its ends the shaft 10 has fast thereon one or more hook-shaped latches 12, the same being keyed to the shaft 10 as shown at 13 so as to be turned thereby when the shaft is operated by means of the thumb piece or head 11 for the purpose of moving the latch into and out of engagement with the pin 9 carried by the remaining knuckle 8 referred to.

Each of the rim sections 4, 5 and 6 is shown as provided with the usual flanges 14 to hold the ordinary clencher tire but it will of course be understood that the cross sectional shape of the collapsible rim may be varied to suit tires of different shapes, types and sizes.

15 designates spacing blocks which are interposed between the felly 3 and the demountable rim B in order to provide room for the latches 12. These spacing blocks 15 are preferably secured in fixed and permanent relation to the felly 3. Any suitable means such as clamps 16 and bolts 17 may be employed for fastening the demountable rim on the felly 3.

From the foregoing description it will now be understood that in order to remove a rim from the tire, it is only necessary to turn the shaft 10 by means of the head 11 sufficiently to rock the latch or latches 12 out of engagement with the pin 9, this of course being done after the rim has been removed from the wheel. After the separable extremities of the rim have thus been disconnected from each other, the sections 5 and 6 of the rim adjacent to such point of separation may be folded inwardly toward each other as indicated in Fig. 2 and this operation may be continued until all of the rim sections have been folded upon each other in compact relation. In order to do this, the rim sections 4, 5 and 6 are preferably made of unequal length so that the extremities thereof will not interfere with the folding operation. When completely folded the rim may be stored in a small space in a car.

In reassembling the tire and rim, the middle section 4 is first placed in engagement with the tire and thereafter the sections 5 and 6 are moved outwardly from each other and away from the section 4 until they are placed in engagement with the tire and finally the two extremities of the rim are latched together by the means and in the manner shown and described.

What I claim is:—

1. A collapsible vehicle wheel rim, embodying a plurality of arcuate sections which collectively form an annular rim structure, said sections being hinged together and each provided with tire holding means, one of the connecting hinges comprising separable knuckles, a hinge pin carried by one of said knuckles, a shaft journaled in the other of said hinge knuckles, and a latch fast on said shaft and movable thereby into and out of engagement with said hinge pin.

2. A collapsible vehicle wheel rim, embodying a plurality of arcuate sections which collectively form an annular rim structure, said sections being hinged together and each provided with tire holding means, one of the connecting hinges comprising separable knuckles, a hinge pin carried by one of said knuckles, a shaft journaled in the other of said hinge knuckles, a latch fast on said shaft and movable thereby into and out of engagement with said hinge pin and an operating head on one end of said shaft.

In testimony whereof I affix my signature in presence of two witnesses.

OSCAR COLLIS IVERS.

Witnesses:
O. B. BENNETT,
T. J. KEANE.